(12) United States Patent
Dagys

(10) Patent No.: US 12,294,628 B2
(45) Date of Patent: *May 6, 2025

(54) METHODS AND SYSTEMS TO MAINTAIN MULTIPLE PERSISTENT CHANNELS BETWEEN PROXY SERVERS

(71) Applicant: Oxylabs, UAB, Vilnius (LT)

(72) Inventor: Gediminas Dagys, Neringa (LT)

(73) Assignee: Oxylabs, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,407

(22) Filed: Jan. 26, 2024

(65) Prior Publication Data

US 2024/0171640 A1    May 23, 2024

Related U.S. Application Data

(63) Continuation of application No. 18/132,872, filed on Apr. 10, 2023, now Pat. No. 11,936,742, which is a
(Continued)

(51) Int. Cl.
*H04L 67/141*    (2022.01)
*H04L 67/02*    (2022.01)
*H04L 67/56*    (2022.01)

(52) U.S. Cl.
CPC ............ *H04L 67/141* (2013.01); *H04L 67/02* (2013.01); *H04L 67/56* (2022.05)

(58) Field of Classification Search
CPC ........ H04L 67/02; H04L 67/141; H04L 67/56
See application file for complete search history.

(56) References Cited

U.S. PATENT DOCUMENTS 7,376,715 B2    5/2008    Cunningham et al.
8,407,350 B2    3/2013    Stephenson et al.
(Continued)

FOREIGN PATENT DOCUMENTS

CN    111447469 A    7/2020
CN    112463366 A    3/2021
(Continued)

OTHER PUBLICATIONS

Written Opinion of the International Searching Authority directed to related International Patent Application No. PCT/IB2021/060202, mailed Jan. 27, 2022; 12 pages.
(Continued)

*Primary Examiner* — Gil H. Lee
(74) *Attorney, Agent, or Firm* — Sterne Kessler, Goldstein & Fox, P.L.L.C.

(57) ABSTRACT

Proxy servers within a service provider infrastructure are enabled to maintain multiple persistent connections among themselves and to exchange data bi-directionally in an unsolicited manner. Specifically, exit proxy servers are enabled to request their respective proxy supernodes to update the already existing network connection to support WebSocket communication channels. Accordingly, the respective proxy supernodes are enabled to update the network connection with the exit proxy servers to support WebSocket communication channels. A single instance of a proxy supernode and an exit proxy server can maintain multiple WebSocket communication channels with each other. By utilizing the said WebSocket communication channels, the proxy supernode and the exit proxy servers can exchange data with each other simultaneously without any data losses. Thus, by exchanging data via the said WebSocket communication channels, the proxy supernodes and
(Continued)

the exit proxy servers are aimed at servicing the proxy clients in processing their data requests.

20 Claims, 7 Drawing Sheets

Related U.S. Application Data continuation of application No. 17/864,266, filed on Jul. 13, 2022, now Pat. No. 11,652,890.

(56) References Cited

U.S. PATENT DOCUMENTS

| | | | |
|---|---|---|---|
| 9,462,089 B1* | 10/2016 | Fallows | H04L 69/14 |
| 9,628,543 B2 | 4/2017 | Lim et al. | |
| 9,723,069 B1* | 8/2017 | Fallows | H04L 67/1036 |
| 10,218,938 B2 | 2/2019 | Taylor et al. | |
| 10,313,252 B2 | 6/2019 | Koopmans et al. | |
| 10,341,692 B2 | 7/2019 | Cardona | |
| 10,382,543 B2 | 8/2019 | Gampel et al. | |
| 10,462,206 B2 | 10/2019 | Thomas | |
| 10,506,064 B2 | 12/2019 | Hudson et al. | |
| 10,542,109 B2 | 1/2020 | Pollack et al. | |
| 10,601,948 B1 | 3/2020 | Juravicius et al. | |
| 10,686,850 B2 | 6/2020 | Fallows et al. | |
| 10,873,647 B1 | 12/2020 | Pilkauskas et al. | |
| 11,184,458 B1 | 11/2021 | Suckel | |
| 11,196,712 B1 | 12/2021 | Norbutas | |
| 11,196,833 B1 | 12/2021 | Norbutas | |
| 11,212,354 B1 | 12/2021 | Pilkauskas et al. | |
| 11,281,730 B1 | 3/2022 | Vilcinskas et al. | |
| 11,316,948 B2 | 4/2022 | Pilkauskas et al. | |
| 11,652,890 B1 | 5/2023 | Dagys | |
| 2009/0034851 A1 | 2/2009 | Fan et al. | |
| 2012/0246190 A1* | 9/2012 | Surtani | G06F 16/278 707/769 |
| 2015/0271233 A1* | 9/2015 | Bouazizi | H04N 21/44209 709/219 |
| 2017/0064003 A1* | 3/2017 | Kubota | H04L 67/63 |
| 2019/0069028 A1* | 2/2019 | Deshpande | H04N 21/8586 |
| 2019/0394558 A1 | 12/2019 | Schobel et al. | |
| 2020/0099961 A1* | 3/2020 | Dice | H04L 67/12 |
| 2020/0274807 A1 | 8/2020 | Hofmann | |
| 2022/0070271 A1 | 3/2022 | Vasiliauskas et al. | |
| 2024/0022635 A1 | 1/2024 | Dagys | |

FOREIGN PATENT DOCUMENTS

| | | |
|---|---|---|
| EP | 2843908 B1 | 3/2015 |
| EP | 3561671 A1 | 10/2019 |
| EP | 3754520 A1 | 12/2020 |
| EP | 3900240 B1 | 10/2021 |
| JP | 5986654 B2 | 9/2016 |
| JP | 6212944 B2 | 9/2017 |
| KR | 20150035387 A | 4/2015 |
| WO | WO 2016/182844 A1 | 11/2016 |
| WO | WO 2019/043687 A2 | 3/2019 |
| WO | WO 2022/053880 A1 | 3/2022 |

OTHER PUBLICATIONS

International Search Report and Written Opinion of the International Searching Authority directed to related International Patent Application No. PCT/IB2022/050940, mailed Apr. 8, 2022; 15 pages.

International Search Report and Written Opinion of the International Searching Authority directed to related International Patent Application No. PCT/IB2022/050747, mailed Apr. 29, 2022; 28 pages.

* cited by examiner

METHODS AND SYSTEMS TO MAINTAIN MULTIPLE PERSISTENT CHANNELS BETWEEN PROXY SERVERS

CROSS REFERENCE TO RELATED APPLICATION

This application claims the benefit of U.S. patent application Ser. No. 18/132,872, filed Apr. 10, 2023, which claims the benefit of U.S. patent application Ser. No. 17/864,266, filed Jul. 13, 2022, the disclosures of which are incorporated by reference herein in their entireties.

FIELD

The present embodiment disclosed herein generally relates to proxy server technologies.

BACKGROUND

Proxy servers, or proxies, act as intermediary network nodes for delivering network communications between users and internet services (remote servers). Users can send their network traffic (e.g., web requests) to the remote servers via proxy servers. When a proxy server receives a request from a user or a client for a particular resource, the proxy server first searches the internal cache for the requested resource and returns it to the user if the requested resource is found in the internal cache. However, if the requested resource is not found in the internal cache, the proxy server forwards the user's request to the particular remote server (e.g., web server) to acquire the requested resource. Eventually, the proxy server receives the requested resource from the remote server and forwards it back to the user. The caching operation of proxies reduces the need for direct communication between users and remote servers, which leads to the prevention of network bottlenecks. Moreover, by sending and receiving network traffic through a proxy, users can avoid revealing their IP addresses to the remote servers.

Besides safeguarding the privacy of internet users, proxies can also be used to avoid internet censorship. Users on the internet may be censored by internet providers and/or governments in certain parts of the world. In such instances, proxy servers can be a suitable solution to circumvent government censorship and retrieve or access information on the internet. Rather than accessing the censored website directly, accessing it through a proxy server situated in another country makes users less likely to be found by the Internet censors.

Proxies are commonly classified based on two categories: a) based on routing pattern; b) based on operational protocol. On the basis of routing pattern, proxies are further classified into the following: i) forward proxies and ii) reverse proxies. Forward proxies are proxy servers that route traffic between the client(s) and another system, usually external to the network. By doing so, forward proxies can regulate traffic according to preset policies, convert and mask client IP addresses, enforce security protocols and block unknown traffic. Systems with shared networks, such as business organizations or datacenters, often use forward proxy servers. It should be mentioned that forward proxies expose a single interface with which clients interact without enforcing all of the policies and route management logic within the clients themselves. A reverse proxy is a proxy server that accepts requests from clients, forwards the requests to another one of many servers, and returns the result from the server that actually processed the request to the client. A forward proxy server allows multiple clients to route traffic to an external network. For instance, a business may have a proxy that routes and filters employees' traffic to the public internet. On the other hand, a reverse proxy routes traffic on behalf of multiple servers. Moreover, a reverse proxy effectively serves as a gateway between clients, users and application servers. It handles all the access policy management and traffic routing, and it protects the server's identity that actually processes the client's request.

Proxies can also be classified based on their IP addresses—residential, datacenter, mobile and ISP proxies. A residential proxy is an IP address from the range designated explicitly by the owning party assigned to private customers. Usually, a residential proxy is an IP address linked to a physical device, for example, a mobile phone or desktop computer. However, businesswise, the blocks of residential IP addresses may be bought from the owning Proxy Service Provider by another company directly, in bulk. The real owners of the residential IP address ranges, namely internet service providers (ISPs), register residential IP addresses in public databases, allowing websites to determine a device's internet provider, network, and location. Residential proxies are broadly categorized into two subdivisions—static residential proxies and rotating residential proxies. Static residential proxies mask clients' actual IP addresses behind a single IP address. On the contrary, rotating residential proxies mask clients' actual IP addresses behind a pool of IP addresses that constantly rotates or changes over time. IP addresses of the rotating residential proxies may belong to different subnets connected with an advanced global IP address network. Most data collection businesses prefer rotating residential proxies over static residential proxies.

Following the residential proxies, datacenter proxies are IP addresses owned by Local Internet Registries (LIRs) such as, but not limited to, web hosting companies and universities. Datacenter proxies are not affiliated with any Internet Service Providers (ISPs). In general, datacenter proxies are known for their exceptional performance, speed and cost-effectiveness. One of the differences between residential and datacenter proxies is that the latter are owned by companies or organizations and not by individuals. Datacenter proxies may be subdivided into private datacenter proxies, public data center proxies, and shared data center proxies. Private datacenter proxies, also known as dedicated datacenter proxies, are IP addresses employed in a specific timeframe or a particular domain. Dedicated datacenter proxies are extremely useful in online data collection operations. Public data center proxies are generally free proxies useful only for fundamental requirements like disguising a client's geo-location to circumvent geo-restriction over the internet. Likewise, shared datacenter proxies are usually shared by several individuals or companies simultaneously. Small businesses with financial constraints may employ shared datacenter proxies.

Mobile proxy servers are another type of proxy server classified based on IP addresses. Mobile proxies are IP addresses with network connections assigned to clients by mobile carriers. Mobile proxies are available on portable devices like smartphones or tablets with internet connections through mobile data. Yet another type of proxy server is the ISP proxy server. The ISP proxy servers are proxies with both residential and datacenter attributes. ISP proxies are supported by an ISP to assign an IP address to the client but are hosted on a datacenter's servers. ISP proxies are configured to aid clients with multiple use cases like residential proxies without compromising performances like datacenter proxies.

Exit node proxies, or simply exit nodes, are proxies, and through these proxies, the request from the user (or the entry node) reaches the internet. There can be several proxies used to perform a user's request, but the exit node proxy is the final proxy that contacts the target and forwards the information from the target to the queue to reach the user. In the current embodiments, proxies and exit nodes can be used as synonyms. The current embodiments are not limited only to the exit nodes and the same technologies can be used for the proxies. However, the term exit node is employed in the current description to clarify the technical differences between exit nodes and proxies. Inherently the exit node device is external to the proxy service provider infrastructure, usually belonging to a private customer, e.g. a smartphone, a computer, a TV, or another internet-enabled electronic device.

In computer networking, WebSocket is an application layer (Open Systems Interconnection model layer 7) communication protocol for a persistent connection that facilitates bi-directional, i.e., full-duplex data exchange between any two network devices (for example, between a client device and a remote server). A regular HTTP connection relies, for example, on a client request to receive a response from the server for every exchange. However, in contrast to the HTTP connections, WebSocket connections allow full-duplex communication. For example, in the context of the networked AV and control systems, WebSocket allows devices to send and receive continuous streams of data to and from any point on the network.

Returning to the topic of proxy servers and proxy service providers, in some instances, there are significant challenges associated with proxy infrastructures. Uncertainties of network connections in a proxy infrastructure can lower clients' satisfaction. In addition, network bandwidth limitations and unreliable network communications can jeopardize and render a proxy infrastructure as unfit to service proxy clients. To summarize several of the key challenges associated with proxy infrastructures:

a. Connection Losses:

Network connection losses occurring among several proxy nodes in a proxy infrastructure can be fatal during executing a client's request. Similarly, even a momentary connection loss occurring between a client/customer and a proxy node in a proxy infrastructure can affect the entire customer experience and, in some instances, may result in loss of data.

b. Unavailability of Proxy Servers:

In some instances, proxy servers or nodes in a proxy infrastructure may become unavailable due to, for example, system overload, system malfunctions, etc. If a proxy infrastructure is unable to detect imminent time-outs or in other words imminent unavailability of its proxy servers, then, in such cases, the functioning of the proxy infrastructure can be unreliable and insufficient.

c. Miscellaneous System Errors:

Proxy servers in a proxy infrastructure may, in some instances, suffer from unexpected errors which may be due to high load requests, or system environment issues. Such occurrences will affect the efficiency of a proxy server, thereby affecting the overall performance of a proxy infrastructure.

d. Bandwidth Limitations:

Proxy infrastructures may be limited to a certain bandwidth threshold which may lead to slow service consumption or request time-out response.

e. Longer Transaction Time:

Network communication within a proxy infrastructure can be slower because of added overheads, such as in the case of HTTP, XML, and the network overheads to a particular remote server. Therefore, longer transaction time or data exchange time can cause delayed services from a proxy infrastructure.

Apart from the above-summarized challenges, service time-out problem is one of the most crucial issues occurring in a proxy infrastructure. A service time-out implies that a proxy server/node is taking longer to respond to a request or data from another proxy server/node in a proxy infrastructure. Therefore, in general, there is a necessity for a feasible solution to overcome several challenges occurring in a proxy infrastructure. The present disclosure provides a solution to several of the above described problems, thereby improving the quality and performance of proxy servers and proxy infrastructures.

SUMMARY

The summary provided herein presents a general understanding of the exemplary embodiments disclosed in the detailed description accompanied by drawings. Moreover, this summary is not intended, however, as an extensive or exhaustive overview. Instead, the only purpose of this summary is to present the condensed concepts related to the exemplary embodiments in a simplified form as a prelude to the detailed description.

Systems and methods for enabling proxy supernodes and exit proxies present in a proxy service infrastructure to exchange messages between them independently without any relation to a previous request or message are disclosed. Systems and methods for proxy supernode and exit proxies to initiate and/or request and/or upgrade an already existing network connection between them to accommodate WebSocket communication channels are disclosed. Furthermore, systems and methods for enabling proxy supernodes to formulate WebSocket messages by integrating data requests received from client devices are disclosed. Likewise, systems and methods for enabling exit proxies to formulate WebSocket messages by integrating services and/or data procured from the target(s) are disclosed.

BRIEF DESCRIPTION OF DIAGRAMS

DETAILED DESCRIPTION

Figure 1:
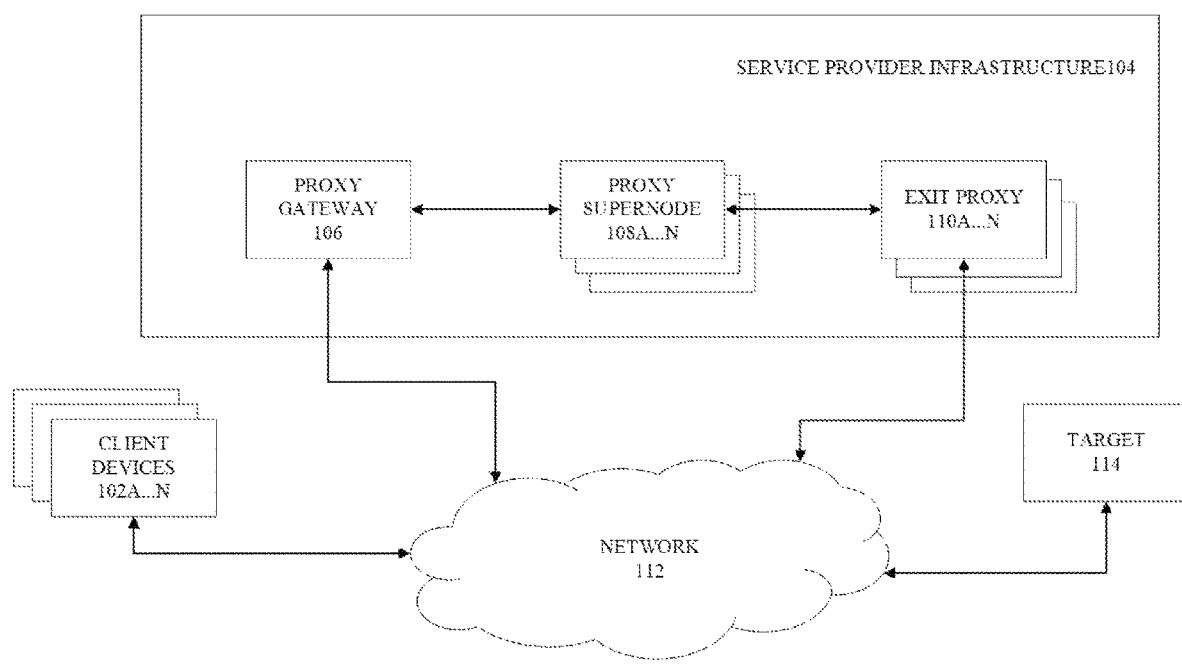
FIG. 1 is an exemplary block diagram of some embodiments disclosed herein.

The following detailed description is provided below along with accompanying figures to illustrate the core aspects of the embodiments disclosed herein. While one or more aspects of the embodiments are described, it should be understood that the described aspects are not limited to any one embodiment. On the contrary, the scope of the present embodiments are only limited by the claims and furthermore, the disclosed embodiments may encompass numerous alternatives, modifications and equivalents. For the purpose of example, several details are described in the following description in order to give a comprehensive understanding of the present embodiments. A person of ordinary skills in the art will understand that the described embodiments may be implemented or practiced according to the claims without some or all of these specific details. In addition, standard or well-known methods, procedures, components and/or systems have not been described in detail so as not to obscure the crucial parts of the disclosed exemplary embodiments.

The term "one embodiment", "an embodiment", "an exemplary embodiment" etc., as used in the current disclosure, imply that the embodiment described may comprise a particular aspect, attribute, or feature, but every embodiment may not necessarily comprise the particular aspect, attribute, or feature. In addition, such terms are not necessarily implying the same embodiment. Furthermore, when a particular aspect, attribute or feature is disclosed in association with an embodiment, it is suggested that it is within the knowledge of one skilled in the art to affect such aspect, attribute or feature in association with other embodiments whether or not explicitly disclosed.

Some general terminology descriptions may be helpful and are included herein for convenience and are intended to be interpreted in the broadest possible interpretation. Elements or entities that are not imperatively defined in the description should have the meaning as would be understood by a person skilled in the art.

In the current embodiments, client devices 102 may be any computing resources or any computing architecture including, but not limited to, a computer device, a personal computer, a laptop computer, a smartphone, a tablet computer, a palm-top computer device, portable media players, GPS units, an E-reader, a gaming device, a digital camcorder, a handheld gaming device, a digital camera, a Wi-Fi speaker, a vehicle infotainment device, an intelligent appliance (e.g., smart refrigerator or smart television), a cloud server, a mainframe, a storage device, a desktop, a workstation, a mobile device, a virtual assistance device, an intelligent printer, or any other electronic device used for requesting resources and/or services from one or more targets over a network. In some instances, the client devices 102 may send resources and/or services to one or more targets over a network. Besides, a person having ordinary skill in the art will understand that the term "client" is being used in the interest of brevity and may refer to any of a variety of entities that may be associated with a subscriber account such as, for example, a person, an organization, an organizational role within an organization and/or a group within an organization. Client devices 102 may approach service provider infrastructure 104 (SPI 104) seeking proxy service by submitting data requests to one of the gateway entities available with SPI 104. The data requests submitted by client device 102 may be for example, multimedia streaming requests or requests for data/resources/service from targets available over network 112.

Service provider infrastructure (SPI 104) may be a combination of resources and/or entities distributed across several geo-locations comprising the infrastructure/environment that offers proxy services to one or more client devices 102 via network 112. In some embodiments, SPI 104 may comprise or be based on cloud computing infrastructures. In the current embodiments, SPI 104 may comprise but is not limited to proxy gateway 106, proxy supernodes 108A . . . N, exit proxies 110A . . . N. As mentioned above, SPI 104 may comprise other standard entities or combinations of resources and/or entities such as, but not limited to databases, storage facilities, proxy rotators, DNS servers, gateway APIs, necessary for executing proxy services.

Proxy gateway 106 may be a computing system and/or collection of computing systems responsible for, among other things, confirming connections with multiple client devices 102 via network 112. Proxy gateway 106 may act as an interface between multiple client devices 102 and several entities of SPI 104 such as, for example, proxy supernodes. Proxy gateway 106 may, among other things, receive data requests from multiple client devices 102 via network 112 and forward the data requests to proxy supernodes. Proxy gateway 106 may receive data/files from proxy supernodes and may forward the received data/files to respective client devices 102 via network 112. In the embodiments disclosed herein, proxy gateway 106 may be an entity of SPI 104.

Proxy supernodes (represented by proxy supernodes 108A . . . N) may be a proxy system or a collection of proxy computing systems/platforms present across several geo-locations across the globe. Proxy supernodes may be capable of accepting, connecting and maintaining network connections with multiple exit proxies from different geo-locations. Furthermore, proxy supernodes may be capable of supporting or accommodating multiple WebSocket communication channels over a single network connection with at least one exit proxy. Proxy supernodes may continuously ping multiple exit proxies to keep the WebSocket communication channels alive. Proxy supernodes may have internal or external storage facilities. Proxy supernodes may store multiple exit proxy metadata within its storage facility. Proxy supernode is one of the key entities present within SPI 104 that offers proxying functionality to multiple client devices 102.

Exit proxies (represented by exit proxies 110A . . . N) may be any instances of a proxy computing system/device or an edge proxy server connected to or in communication with at least one proxy supernode. Typically exit proxies are situated across several geo-locations across the globe either physically or virtually through cloud computing technology. Exit proxies may be capable of requesting a network upgrade from at least one proxy supernode to support WebSocket communication channels. On the same note, exit proxies may be capable of supporting multiple WebSocket communication channels with at least one proxy supernode. In the current embodiments, exit proxies may be an entity of SPI 104. Exit proxies may query and procure data and/or files and/or services from a target.

Target 114 may be an instance of a server/computer system serving resources or other services (e.g., media contents, data, educational information, etc.) over the network 112. Target can be identified and accessed by, for example, a particular IP address, a domain name, and/or hostname, possibly with a defined network protocol port. Target 114 may be a remote system serving data or services accessible through standard network protocols. Also, target 114 may be a physical or a cloud server.

Network 112 can be any digital telecommunications network that allows multiple network systems/devices/infrastructures to share and access resources. Examples of a network: local-area networks (LANs), wide-area networks (WANs), campus-area networks (CANs), metropolitan-area networks (MANs), home-area networks (HANs), intranet, extranet, internetwork, and internet.

FIG. 1 is an exemplary block diagram of some embodiments disclosed herein. Particularly, FIG. 1 illustrates exemplary instances of client devices 102, SPI 104, target 114 and network 112. SPI 104 may further comprise proxy gateway 106, proxy supernodes 108A . . . N, exit proxies 110A . . . N. However a person of ordinary skill in the art will understand that SPI 104 may comprise other resources and/or entities necessary for processing and servicing multiple client devices 102 via appropriate proxy servers.

The entities and/or resources illustrated in FIG. 1 implement the exemplary embodiments of the current disclosure; however, in some embodiments, the entities and/or resources may have different titles or be combined into a single element instead of two separate entities and/or resources. Such combinations or arrangements may not affect or alter the functionalities of elements and the flow of information between entities and/or resources. Therefore, FIG. 1, as shown, should be interpreted as exemplary only and not restrictive or exclusionary of other features, including features discussed in other areas of this disclosure.

In FIG. 1, network 112 can be local area networks (LANs), wide-area networks (WANs), campus-area networks (CANs), metropolitan-area networks (MANs), home-area networks (HANs), Intranet, Extranet, internetwork, or internet. However, the internet is the most relevant network for the functioning of the present embodiment. Connection to network 112 may require that client devices 102, proxy gateway 106, proxy supernodes 108A . . . N and exit proxies 110A . . . N, and target 116 execute software routines that support implementation of, for example, but not limited to, TCP/IP communications.

Referring to FIG. 1, in some embodiments, one or more exit proxies may request network connections from at least one proxy supernode present within the service provider infrastructure 104. In response, the at least one proxy supernode may respond to the requests from one or more exit proxies and eventually may establish network connections with one or more exit proxies. After connecting with at least one proxy supernode, the one or more exit proxies may further request the at least one proxy supernode to upgrade the established network connection to support WebSocket communication channels. In response, the at least one proxy supernode connected to one or more exit proxies may upgrade the network connection to support WebSocket communication channels. Upon upgradation of the said network connection, WebSocket communication channels are established between the at least one proxy supernode and the one or more exit proxies.

Furthermore, after upgrading the network connection to support WebSocket communication channels, the one or more exit proxies may transmit platform messages to the at least one proxy supernode. The platform messages may comprise metadata of the one or more exit proxies, such as, but not limited, to operating system configurations, battery level, network type, unique ID. The at least one proxy supernode may receive the aforesaid platform messages from the one or more exit proxies and save the metadata present in the platform messages within its storage facility. In some embodiments, the at least one proxy supernode may arrange or group the metadata of exit proxies into pools based on, for instance, but not limited to geo-location, operating system configurations, network types.

Thus, it should be understood that in the embodiments disclosed herein, at any given instance, at least one proxy supernode present within SPI 104 may hold network connections, or in other words, be connected to one or more exit proxies. It is important to understand that exit proxies may be located across several geo-location physically or over a cloud technology. Further, in the embodiments disclosed herein, at least one exit proxy may request a proxy supernode present within SPI 104 to upgrade the existing network connection between them to support and/or accommodate WebSocket communication channels. Furthermore, at least one proxy supernode present within SPI 104 can upgrade and maintain multiple WebSocket channels with at least one exit proxy.

The WebSocket communication channels established between the at least one proxy supernode and the one or more exit proxies are persistent and allow bi-directional, full-duplex communications. WebSocket communication channels can enable both proxy supernodes and exit proxies to exchange data between them independent of each other at any time without restrictions, i.e., without requiring an initiation request or solicitation from either of the said entities. In addition, the WebSocket communication channels enable the said entities to exchange data with each other concurrently. The WebSocket communication channels between proxy supernodes and exit proxies are persistent and are kept alive using a series of 'ping-pong' processes, in which proxy supernodes continuously ping exit proxies for a response. In the embodiments disclosed herein, a proxy supernode may terminate a WebSocket communication channel with an exit proxy only in case of an explicit command from the administrator of SPI 104 or in case of system maintenance. Therefore, in the embodiments disclosed herein, proxy supernodes and exit proxies are connected via persistent communication channels that allows bi-directional, full-duplex communications.

Furthermore, the WebSocket channels established between proxy supernodes and exit proxies help in reducing the network latency significantly. Due to the persistent connection, as described previously, all data packets exchanged between proxy supernode and exit proxies will be devoid of conventional overheads and will comprise only relevant data (i.e., payloads). Overheads are additional information or data that are required to accompany payloads or the actual data to be exchanged to ensure effective delivery. Therefore, in the embodiments disclosed herein, proxy supernodes and exit proxies are connected through communication channels that are faster due to lower network latency.

Further, the WebSocket channels established between proxy supernodes and exit proxies can accommodate additional functionalities and/or subprotocols. The necessary subprotocols or additional functionalities can be agreed between proxy supernodes and exit proxies during the upgrading of the network connection to support WebSocket communications. Hence, the network connections between proxy supernodes and exit proxies are flexible to accommodate additional functionalities and/or subprotocols. In addition, the WebSocket channels established between proxy supernodes and exit proxies can allow for data encryption, which renders the network connection between proxy supernodes and exit proxies secure against potential dangers, like for example, man in the middle attacks.

Thus, after upgrading the network connections between proxy supernodes and exit proxies to support WebSocket communication channels, the said entities can exchange data between them independent of each other at any time, or independent of each other concurrently. Such arrangements, improves overall performance and efficiency of SPI 104 in servicing multiple clients.

Referring again to FIG. 1, in some embodiments, a single instance of a client device 102 may connect and submit a data request to proxy gateway 106 via network 112. Proxy gateway 106 is present within SPI 104. The connection between the client device 102 and proxy gateway 106 may be based on a request-response protocol, such as, but not limited to, HTTP/HTTPS over a TCP connection. The said data request, in some exemplary instance, may be composed by the client (i.e., the owner and/or employer and/or administrator of the client device 102) and may be intended for target 114. Moreover, the said data request may be, in some exemplary instance, a request for service(s)/data from target 114, such as, but not limited to, a media streaming request. The said data request may comprise, among other things a target URL (i.e., URL of target 114).

Proxy gateway 106 upon receiving the data request from the client device 102 may generate and designate a unique ID known as the request ID to the said data request. Additionally, proxy gateway 106 may save and/or store the request ID designated to the said data request within its memory and/or storage facility. The request ID may be, but is not limited to, a unique combination of numbers and letters used to identify the individual data request submitted by the client device 102. Proxy gateway 106 may forward the said data request accompanied with the request ID to one of the several proxy supernodes present within SPI 104. Upon reception of the said data request, the proxy supernode may evaluate the said data request and select a befitting exit proxy from among a plurality of exit proxies connected to the proxy supernode. Especially, the proxy supernode may analyze metadata of the connected exit proxies to select a befitting exit proxy.

As described earlier, the proxy supernode may be connected to a plurality of exit proxies through persistent bidirectional WebSocket communication channels. Therefore, the proxy supernode may be connected to the aforesaid befitting exit proxy via a persistent bidirectional WebSocket communication channel. Subsequently, the proxy supernode may formulate a WebSocket message integrating the said data request. In other words, the proxy supernode may formulate a WebSocket message indicating the type of service(s)/data requested by the client from target 114. Furthermore, the aforementioned WebSocket message may be encoded by using, for example, but not limited to, MessagePack protocol. Subsequently, the proxy supernode transfers instantaneously in an unsolicited manner to the befitting exit proxy via the WebSocket communication channel. The WebSocket message formulated by proxy supernode 108A may avoid unnecessary data being transmitted, such as, for example, status code, headers, protocol version, etc; this may reduce a significant amount of headers, thereby reducing network latency and complexity of handling real-time, high speed data exchange.

The befitting exit proxy may receive the aforesaid WebSocket message from the proxy supernode, query target 114, and procure the requested service(s)/data from target 114. It should be understood that the connection between the befitting exit proxy and target 114 may be based on request-response protocol, such as, but not limited to HTTP/HTTPS over a TCP connection. After procuring the service(s)/data from target 114, the befitting exit proxy may formulate a WebSocket message integrating the procured service(s)/data procured from target 114 and transfer the aforesaid WebSocket message to the proxy supernode. Subsequently, the proxy supernode may receive the WebSocket message and forward the procured service(s)/data integrating in the aforesaid WebSocket message to proxy gateway 106, which ultimately forwards the procured service(s)/data to the client device 102 via network 112.

In the manner as described above, the proxy supernode may receive multiple data requests (submitted by the same or several other client devices 102) from proxy gateway 106, formulate WebSocket messages integrating the data requests, select befitting exit proxy from among a plurality of connected exit proxies and transfer the WebSocket messages to the befitting exit proxies in an unsolicited manner without any restrictions or requirements. Likewise, the befitting exit proxy may receive multiple WebSocket messages from the proxy supernode, query and procure service(s)/data from target 114, formulate multiple WebSocket messages integrating the procured service(s)/data and transfer the WebSocket messages to the proxy supernode instantaneously in an unsolicited manner without any restrictions or requirements. In this way, the embodiments disclosed herein, provides methods and systems for proxy supernodes and exit proxies to exchange data/messages with each other independently at any time in an unsolicited manner. Moreover, the WebSocket communication channels enables bi-directional, full-duplex, high speed data exchanges between the proxy supernodes and the exit proxies.

Figure 2:
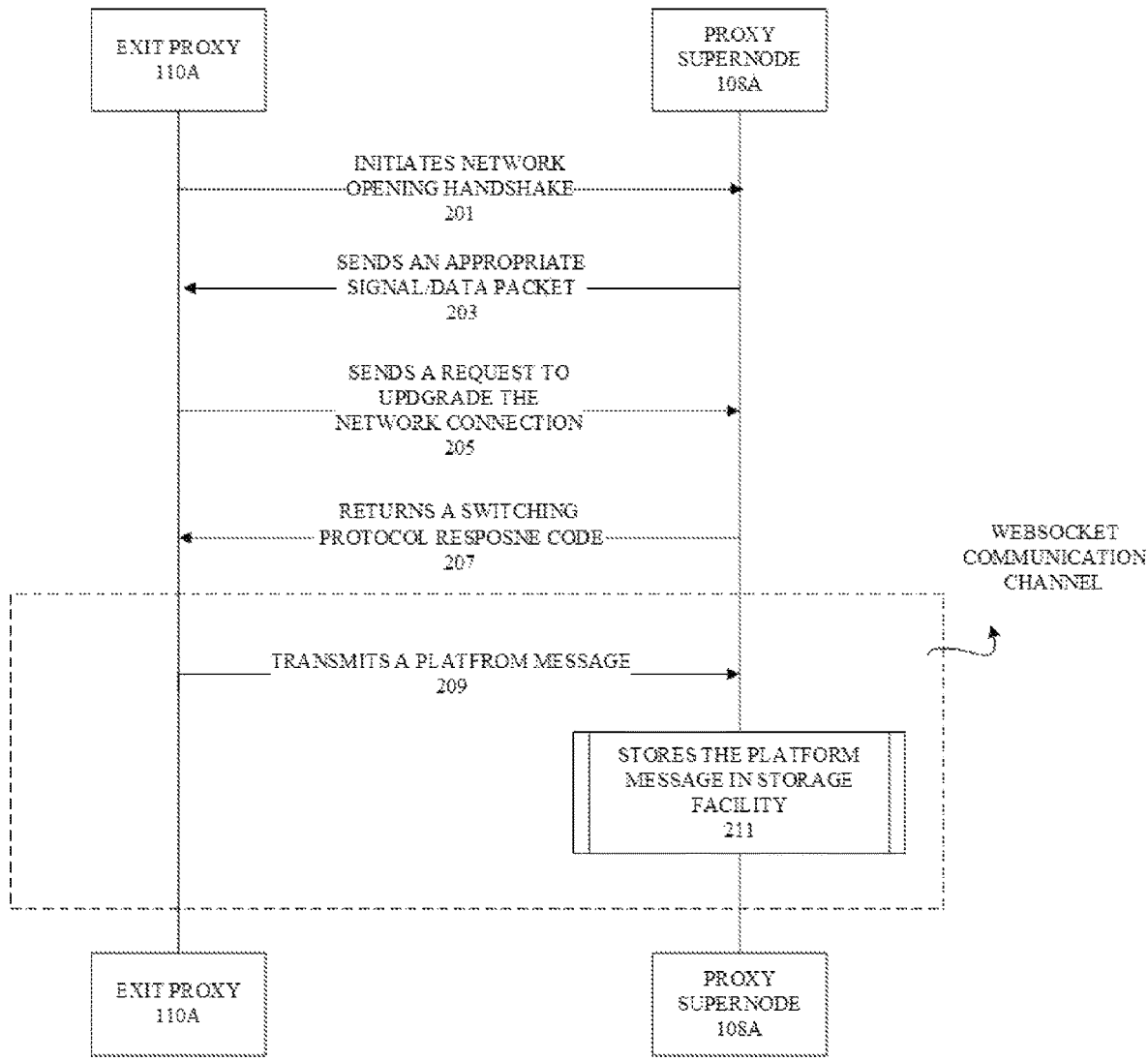
FIG. 2 is an exemplary sequence flow diagram showing an exit proxy requesting a proxy supernode to upgrade the established network connection to support WebSocket communication channels.
Figure 3A:
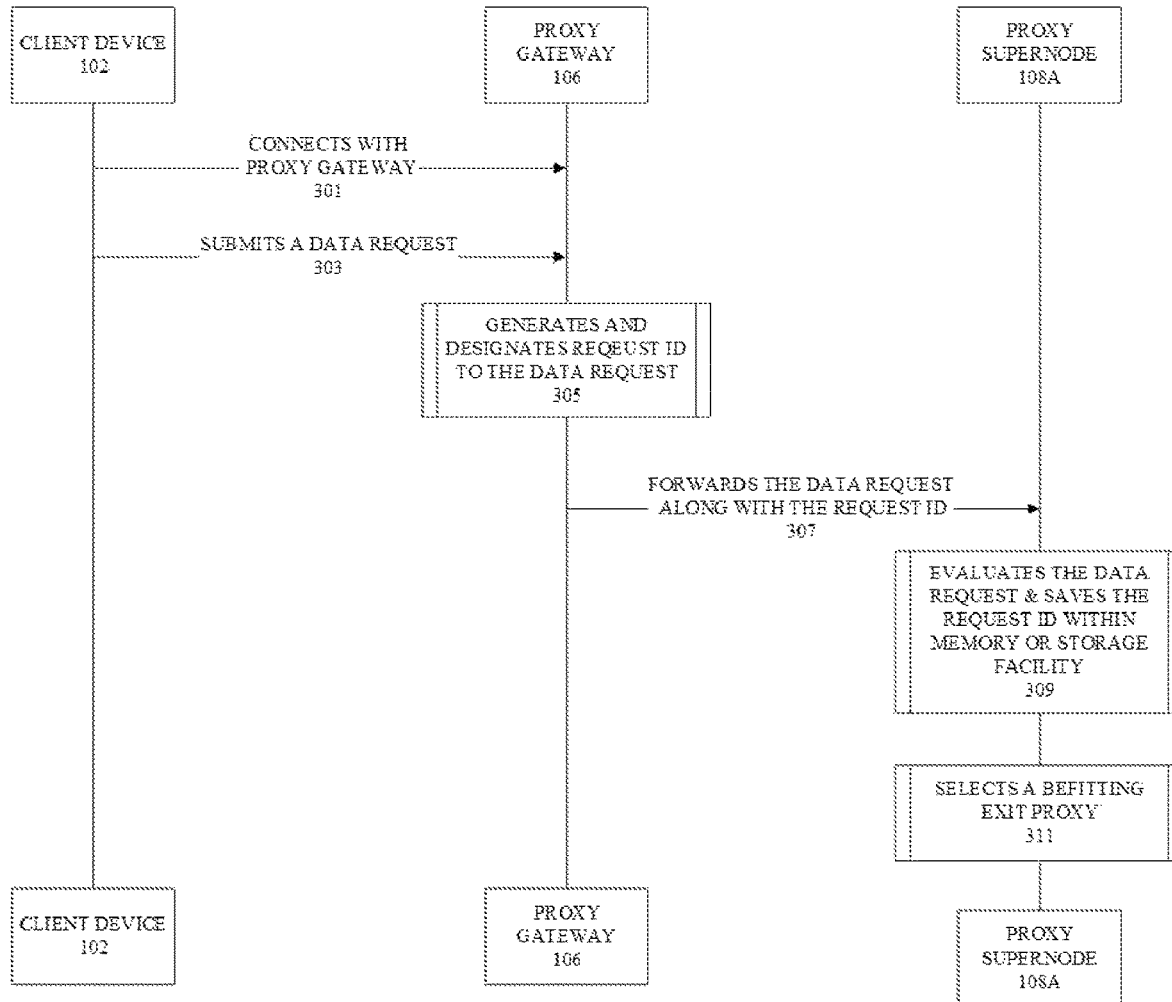
FIGS. 3A-3D are an exemplary sequence flow diagram showing the servicing of a data request originating from a client device 102.
Figure 3B:
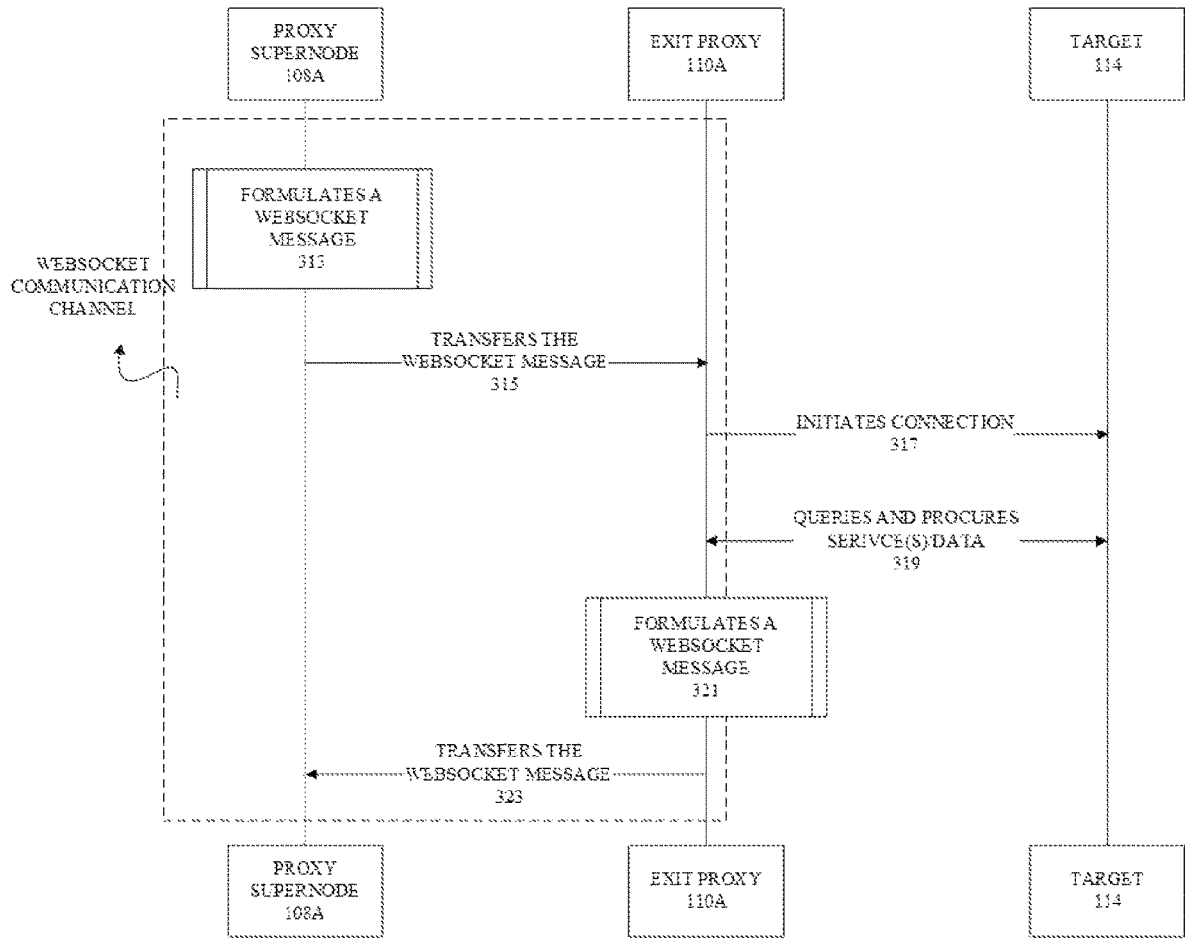
Figure 3C:
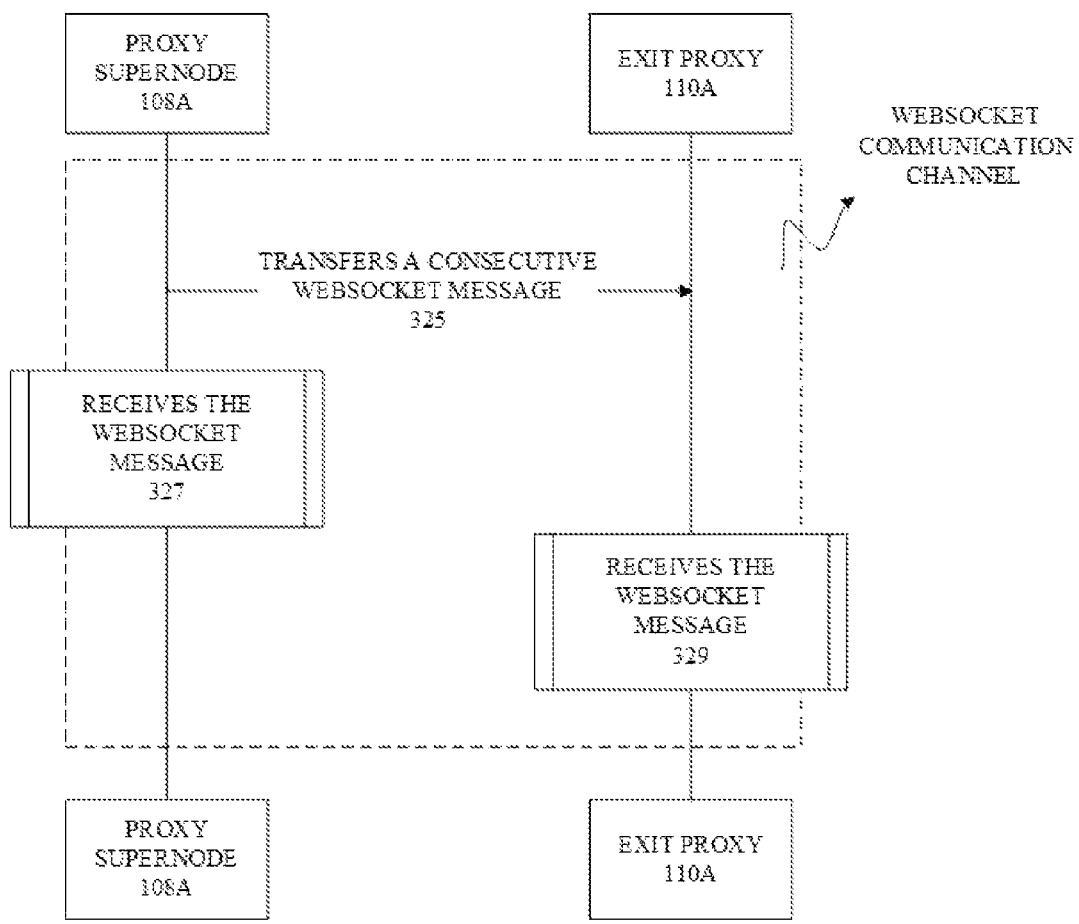
Figure 3D:
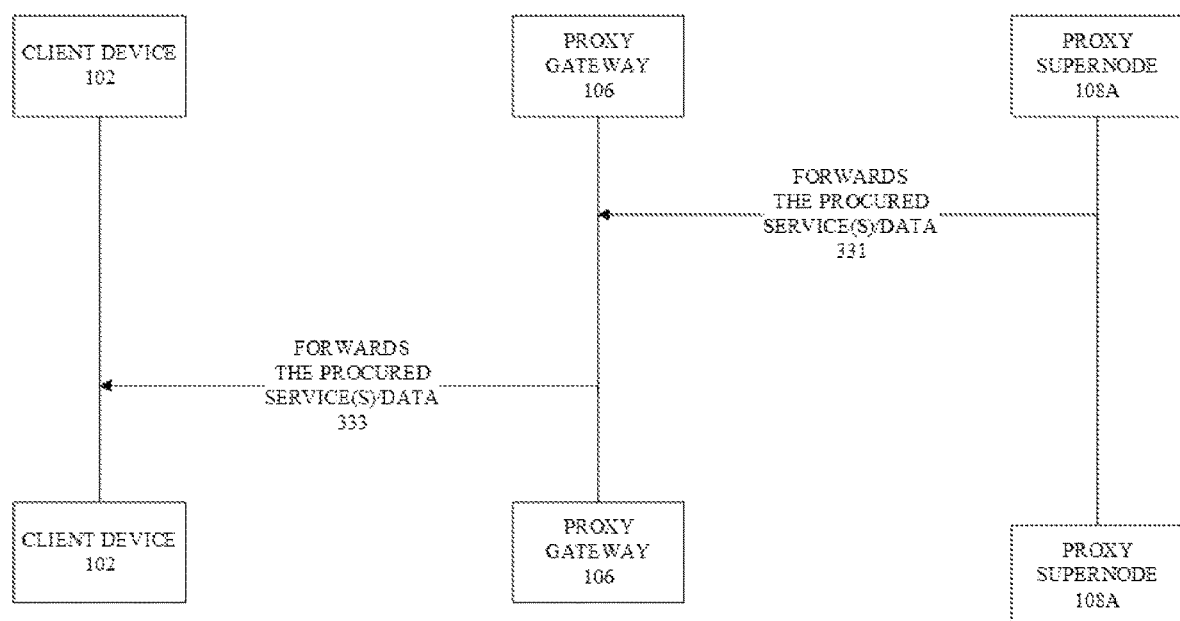

FIG. 2 is an exemplary sequence flow diagram showing an exit proxy requesting a proxy supernode to upgrade the established network connection to support WebSocket communication channels. The flow diagram begins at step 201 wherein exit proxy 110A requests a network connection (e.g., TCP/IP connection) from proxy supernode 108A. Specifically, exit proxy 110A, at step 201, initiates a network opening handshake (e.g., TCP handshake) with proxy supernode 108A by sending an appropriate signal/data packet (e.g., SYN packet in a TCP handshake) to the IP address of proxy supernode 108A. At step 203, proxy supernode 108A reacts to the request of network connection from exit proxy 110A. More precisely, proxy supernode 108A reacts to the network opening handshake (initiated by exit proxy 110A) by sending an appropriate response signal/data packet (e.g., SYN/ACK packet in a TCP handshake) to exit proxy 110A. It should be understood that there can be subsequent signals/data packets exchanged between exit proxy 110A and proxy supernode 108A as part of the network opening handshake. Therefore, steps 201 and 203 are meant to comprise all steps necessary to complete the network opening handshake such as, for example, TCP handshake between exit proxy 110A and proxy supernode 108A. Thus, after executing steps 201 and 203, a TCP connection is established between proxy supernode 108A and exit proxy 110A.

At step 205, once a TCP connection is established as described above, exit proxy 110A sends a HTTP request to proxy supernode requesting to upgrade the network connection (i.e., TCP connection) to support WebSocket protocol communication channels. Specifically, exit proxy 110A, at step 205, initiates a WebSocket opening handshake with proxy supernode 108A by sending A GET request to proxy supernode 108A indicating the need to upgrade the network connection to support WebSocket communication channels. An exemplary GET request sent by exit proxy 110A comprises:

GET wss://proxy supemode.com/HTTP/1.1
Host: proxy supernode.com:8000
Connection: Upgrade
Upgrade: websocket
Sec-WebSocket-Key: AbWdxX300
Sec-WebSocket-Version: 13

The above shown GET message is only exemplary and may comprise additional headers and values. In the GET message the header Sec-WebSocket-Key may contain a base 64-encoded one-time random value sent by exit proxy 110A.

At step 207, proxy supernode 108A responds to the request to upgrade network connection from exit proxy 110A. More precisely, at step 207, proxy supernode 108A, reads the GET request and returns a HTTP/HTTPS 101 switching protocol response code to exit proxy 110A, thereby upgrading the network connection to support WebSocket communication channels. In other words, the WebSocket communication channel is now established between exit proxy 110A and proxy supernode 108A. An exemplary HTTP 101 switching protocol response code comprises:

HTTP/1.1 101 switching protocols
Connection: upgrade
Upgrade: websocket
Sec-WebSocket-Accept: s3pPLMBi The above shown response code is only exemplary and may comprise additional headers or other headers to support additional subprotocols. As a result of upgrading the network connection between exit proxy 110A and proxy supernode 108A as described above, the network connection is now persistent and allows bi-directional, full-duplex communications/data exchange. Moreover the persistent connection is also a stateful connection meaning that proxy supernode 108A can keep track of data that were sent to exit proxy 110A and vice-versa without relying on cookies or session IDs. In some exemplary instances of the embodiments disclosed herein, proxy supernode 108A can continuously ping exit proxy 110A for responses in order to keep the persistent connection alive.

As previously mentioned, the persistent and bidirectional communication channel between proxy supernode 108A and exit proxy 110A aids in reducing the network latency significantly. As the persistent communication channel is established by a one-time handshake, the data exchanged between proxy supernode 108A and exit proxy 110A can avoid a significant amount of overheads along with each data transmission, thereby ensuring faster, efficient data exchange.

To wit, the upgradation of the network connections to support WebSocket communications between proxy supernode 108A and exit proxy 110A can allow the said entities to exchange data independent of each other at any time. Moreover the data exchange through WebSocket communication channels are bi-directional, faster, flexible, and secure. Such arrangements, improves overall performance and efficiency of SPI 104 in servicing multiple clients.

At step 209, after upgrading the network connection between proxy supernode 108A and exit proxy 110A to support WebSocket communication, exit proxy 110A transmits a platform message to proxy supernode 108A. The platform message transmitted by exit proxy 110A may comprise metadata of exit proxy 110A such as but not limited to operating system configurations, battery level, network type, unique ID, IP address, and geo-location. At step 211, proxy supernode 108A receives the platform message transmitted by exit proxy 110A and stores the information contained in the platform message (i.e., exit proxy metadata) within its storage facility.

FIG. 2 is only an exemplary sequence flow diagram showing a single instance of exit proxy, however in actuality, there can be multiple exit proxies connected to the proxy supernode and the said multiple exit proxies can send their respective platform messages to the proxy supernode. In such instances, the proxy supernode stores the multiple exit proxy metadata by arranging the exit proxy metadata into categories or pools based on, for instance, but not limited to geo-location, operating system configurations, and network types.

FIGS. 3A-3D are an exemplary sequence flow diagram showing the servicing of a data request originating from client device 102. In the current exemplary sequence flow diagram, a client device 102 begins by connecting to proxy gateway 106 present within SPI 104 via network 112 (at step 301). It should be understood that step 301 represents all relevant steps executed by both the client device 102 and proxy gateway 106 to initiate and establish a connection based on a request-response protocol, such as, but not limited to HTTP/HTTPS over a TCP connection. Once the client device 102 is connected to proxy gateway 106, the client device 102 submits a data request to proxy gateway 106 (step 303). The data request can be, for example, a HTTP/HTTPS request comprising the following:

i. a start-line section comprising, among other things, the type of service/data requested from target 114, such as, for example, a media streaming request from target 114 and target URL (i.e., URL of target 114).

ii. a set of HTTP/HTTPS headers.

The data request, in some instances, is composed by the client, (i.e., the owner and/or employer and/or administrator of the client device 102), and is aimed at target 114. Proxy gateway 106 receives the data request submitted by the client device 102 and designates a unique ID, hereinafter referred to as the request ID, to the data request (at step 305). More precisely, proxy gateway 106, upon receiving the data request, generates and designates a request ID to the data request. The request ID can be, but is not limited to, a unique combination of numbers and letters used to identify the individual data request submitted by the client device 102. In addition, proxy gateway 106 saves and/or stores the request ID that was designated to the data request within its memory and/or storage facility.

Sequentially, proxy gateway 106 connects and forwards the data request submitted by the client device 102 to one of the several proxy supernodes present within SPI 104 (at step 307). Also, it should be understood that, proxy gateway 106 forwards the data request along with the request ID. In the current exemplary sequence flow diagram, proxy gateway 106 connects to proxy supernode 108A and forwards the data request submitted by the client device 102 to proxy supernode 108A. It should be recalled that the data request submitted by the client device 102 can be, for example, a HTTP/HTTPS request.

Following the reception of the data request from proxy gateway 106, proxy supernode 108A evaluates the data request, and saves and/or stores the request ID within its memory and/or storage facility (at step 309). Subsequently, proxy supernode 108A selects a befitting exit proxy from a plurality of connected exit proxies (at step 311). It should be recalled that a single instance of proxy supernode can be connected to a plurality of exit proxies through WebSocket communication channels. More precisely, at step 311, proxy supernode 108A analyzes metadata of connected exit proxies and selects the befitting exit proxy to service the data request. It should also be recalled that a proxy supernode stores the metadata of connected exit proxies within its storage facility; therefore, a proxy supernode can retrieve the stored metadata to analyze and select a befitting exit proxy, as described at step 311. Also, it is important to note that in the current exemplary sequence flow diagram, exit proxy 110A represents the befitting exit proxy selected by proxy supernode 108A.

Upon selecting the befitting proxy (in the current exemplary sequence flow diagram represented by exit proxy 110A), proxy supernode 108A formulates a WebSocket message (at step 313) indicating the type of service/data requested by the client from target 114, such as, but not limited to, a media streaming request from target 114. The WebSocket message formulated and transmitted by proxy supernode 108A to exit proxy 110A comprises, but is not limited to, the following:
i. message type: comprises information on type of message being sent and/or details of service(s)/data requested from target 114.
ii. message ID: binary based universally unique identifier (UUID). The message ID is exclusive to the particular WebSocket message. In addition, the message ID is associated with the corresponding request ID of the original data request.

Furthermore, the WebSocket message formulated by proxy supernode 108A is encoded by using, for example, but not limited to, MessagePack protocol. Unlike the HTTP/HTTP request, the WebSocket message formulated by proxy supernode 108A avoids unnecessary data being transmitted, such as for example, status code, headers, protocol version, etc; this reduces a significant amount of headers, thereby reducing network latency and complexity of handling real-time, high speed data exchange.

Sequentially, proxy supernode 108A, transfers the aforementioned WebSocket message to exit proxy 110A via the previously established WebSocket communication channel (at step 315). Since, proxy supernode 108A holds a persistent connection with exit proxy 110A (i.e., the WebSocket communication channel), proxy supernode 108A is not required to initiate a network connection with exit proxy 110A. Instead, proxy supernode 108A directly transfers the WebSocket message to exit proxy 110A as shown at step 315. In this way, proxy supernode 108A can send/transfer messages to exit proxy 110A in an unsolicited manner at any time.

Upon receiving the WebSocket message from proxy supernode 108A, exit proxy 110A reads the WebSocket message, saves the message ID, and initiates a network connection with target 114 over a standard request-response protocol, such as, but not limited to HTTP/HTTPS, that utilizes a TCP/IP based connection to facilitate the data exchange (at step 317). After which, exit proxy 110A queries target 114 and procures from target 114, the service(s)/data requested from target 114 by the client (at step 319). It should be recalled that the WebSocket message received by exit proxy 110A from proxy supernode 108A comprises, among other things, details on service(s)/data requested from target 114 by the client. Additionally, it should be noted that exit proxy 110A queries target 114 by using, but not limited to, a HTTP/HTTP channel over a TCP/IP connection. After procuring the service(s)/data from target 114, exit proxy 110A formulates a WebSocket message integrating the procured service(s)/data from target 114 (at step 321) and instantaneously transfers the said WebSocket message to proxy supernode 108A (at step 323).

However, before receiving the WebSocket message from exit proxy 110A, proxy supernode 108A, contemporaneous to step 323, transfers a consecutive WebSocket message to exit proxy 110A (at step 325). The consecutive WebSocket message may indicate the type of service requested by a different client from a different target or target 114 (not shown). It must be understood that prior to transferring the consecutive WebSocket message, a different instance of client device 102 may submit a data request to proxy gateway 106, which forwards the data request to proxy supernode 108A.

Proxy supernode 108A receives the WebSocket message transferred by exit proxy 110A in step 323 (at step 327). Contemporaneously, exit proxy receives the consecutive WebSocket message transferred by proxy supernode 108A (at step 329). It should be understood that due to the WebSocket communication channel between proxy supernode 108A and exit proxy 110A, steps 323, 325, 327, and 321 occur contemporaneously in real-time without any delay. However, FIGS. 3A-3D are only exemplary, in actuality, proxy supernode 108A and exit proxy 110A can transfer or exchange multiple WebSocket messages with each other in an unsolicited manner at any time. Moreover, the exchange of the said messages are always instantaneous without any delay or loss.

Proxy supernode 108A forwards the procured service(s)/data integrating within the WebSocket message (received from exit proxy 110A) to proxy gateway 106 (at step 331), which ultimately forwards the procured service/data to client device 102 (at step 333). In the current example, proxy supernode 108A is shown as sending a consecutive WebSocket message to exit proxy while receiving WebSocket messages from exit proxy. However in actual implementation, both proxy supernode 108A and exit proxy 110A can transfer WebSocket messages to each other in an unsolicited manner at any time. Moreover, the connection between proxy supernode 108A and exit proxy 110A is persistent, which enables message transfers with minimum overheads. Such minimum overheads in message transfers reduces overall network load and complexity of handling real-time communication.

Figure 4:
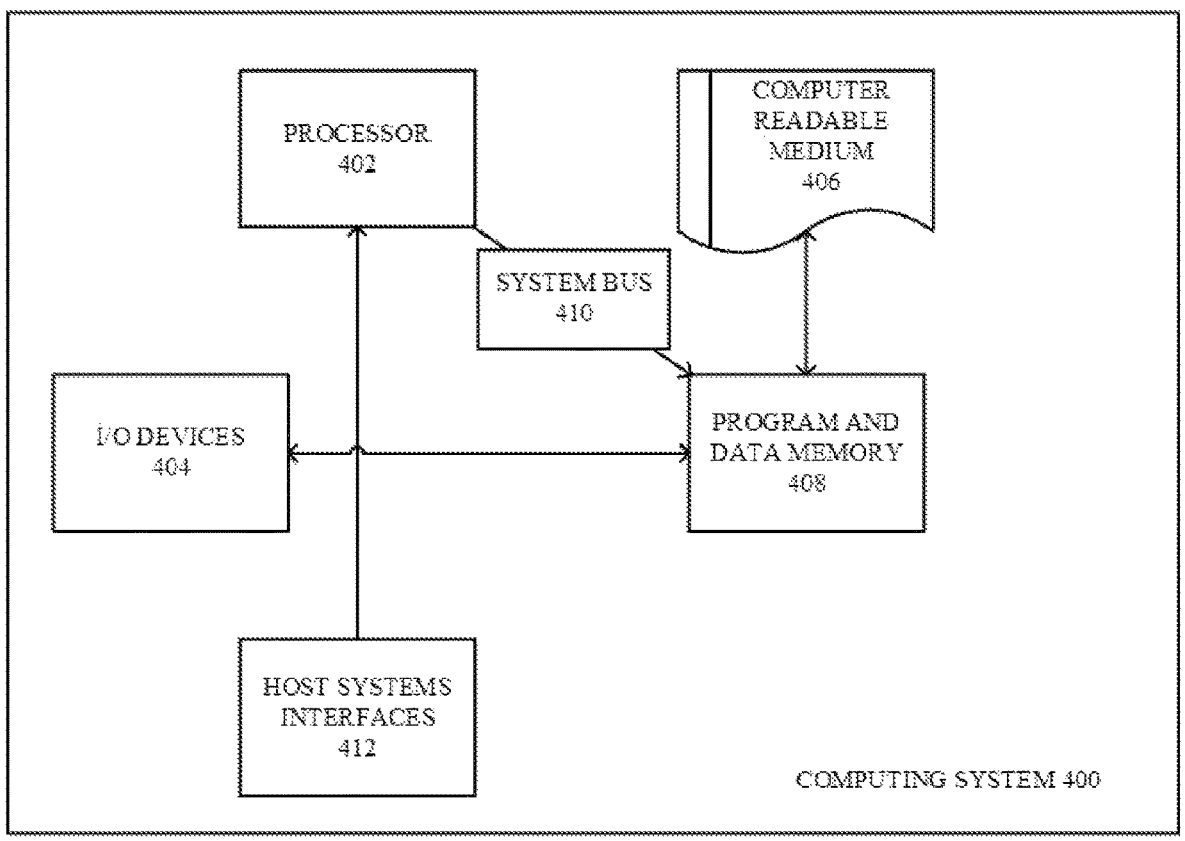
FIG. 4 shows a block diagram of an exemplary computing system.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 4 illustrates a computing system 400 in which a computer readable medium 406 may provide instruction for performing any methods and processes disclosed herein.

Furthermore, some aspects of the embodiments herein can take the form of a computer program product accessible from the computer readable medium 406 to provide program code for use by or in connection with a computer or any instruction execution system. For the purposes of this description, the computer readable medium 406 can be any apparatus that can tangibly store the program code for use by or in connection with the instruction execution system, apparatus, or device, including the computing system 400.

The computer readable medium 406 can be any tangible electronic, magnetic, optical, electromagnetic, infrared, or semiconductor system (or apparatus or device). Some examples of a computer readable medium 406 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 400 can include one or more processors 402 coupled directly or indirectly to memory 408 through a system bus 410. The memory 408 can include local memory employed during actual execution of the program code, bulk storage, and/or cache memories, which provide temporary storage of at least some of the program code in order to reduce the number of times the code is retrieved from bulk storage during execution.

Input/output (I/O) devices 404 (including but not limited to keyboards, displays, pointing devices, I/O interfaces, etc.) can be coupled to the computing system 400 either directly or through intervening I/O controllers. Network adapters may also be coupled to the computing system 400 to enable the computing system 400 to couple to other data processing systems, such as through host systems interfaces 412, printers, and/or storage devices through intervening private or public networks. Modems, cable modems, and ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, singular or plural form can be used, but it does not limit the scope of the disclosure and the same teaching can apply to multiple objects, even if in the current application an object is referred to in its singular form.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

What is claimed is:

1. A method of enabling proxy servers to exchange data independently without any relation to a previous request or message through a persistent connection within a service provider infrastructure, the method comprising:
    initiating, by an exit proxy, a first network connection with a proxy supernode in the service provider infrastructure;
    transmitting, by the exit proxy, a request to upgrade the first network connection to support WebSocket communication channels to the proxy supernode;
    receiving, by the exit proxy, a Hypertext Transfer Protocol (HTTP) 101 switching protocol response code from the proxy supernode, wherein the HTTP 101 switching protocol response code establishes a WebSocket communication channel between the exit proxy and the proxy supernode;
    receiving, by the exit proxy, a first WebSocket message from the proxy supernode, the first WebSocket message specifying (i) a uniform resource locator (URL) of a target server and (ii) service or data requested by a client from the target server;
    initiating, by the exit proxy, a second network connection with the target server;
    querying, by the exit proxy, the target server for the service or data requested by the client;
    in response to procuring the service or data requested by the client from the target server, formulating, by the exit proxy, a second WebSocket message integrating the procured service or data; and
    transmitting, by the exit proxy, the second WebSocket message to the proxy supernode via the WebSocket communication channel.

2. The method of claim 1, further comprising receiving, by the exit proxy, a third WebSocket message from the proxy supernode, the third WebSocket message specifying a service or data requested by a different client from a different target.

3. The method of claim 2, wherein the first, second, and third WebSocket messages are encoded using a MessagePack protocol.

4. The method of claim 2, wherein the first, second, and third WebSocket messages are transmitted between the proxy supernode and the exit proxy via the WebSocket communication channel in an unsolicited manner without any restrictions or requirements.

5. The method of claim 1, further comprising transmitting, by the exit proxy, metadata to the proxy supernode, wherein the metadata comprises at least one of: operating system configuration, battery level, network type, unique identifier (ID), internet protocol (IP) address, or geolocation.

6. The method of claim 1, wherein the WebSocket communication channel is persistent and allows bi-directional and full-duplex data exchange between the exit proxy and the proxy supernode.

7. The method of claim 6, wherein the WebSocket communication channel is kept alive using a series of ping-pong processes.

8. A non-transitory computer-readable device having instructions stored thereon that, when executed by at least one computing device, cause the at least one computing device to perform operations comprising:
    initiating a first network connection with a proxy supernode in a service provider infrastructure;
    transmitting a request to upgrade the first network connection to support WebSocket communication channels to the proxy supernode;

receiving a Hypertext Transfer Protocol (HTTP) 101 switching protocol response code from the proxy supernode, wherein the HTTP 101 switching protocol response code establishes a WebSocket communication channel with the proxy supernode;

receiving a first WebSocket message from the proxy supernode, the first WebSocket message specifying (i) a uniform resource locator (URL) of a target server and (ii) service or data requested by a client from the target server;

initiating a second network connection with the target server;

querying the target server for the service or data requested by the client;

in response to procuring the service or data requested by the client from the target server, formulating a second WebSocket message integrating the procured service or data; and transmitting the second WebSocket message to the proxy supernode via the WebSocket communication channel.

9. The non-transitory computer-readable device of claim 8, wherein the operations further comprise receiving, by an exit proxy, a third WebSocket message from the proxy supernode, the third WebSocket message specifying a service or data requested by a different client from a different target.

10. The non-transitory computer-readable device of claim 9, wherein the first, second, and third WebSocket messages are encoded using a MessagePack protocol.

11. The non-transitory computer-readable device of claim 9, wherein the first, second, and third WebSocket messages are transmitted to and from the proxy supernode via the WebSocket communication channel in an unsolicited manner without any restrictions or requirements.

12. The non-transitory computer-readable device of claim 8, wherein the operations further comprise transmitting exit proxy metadata, wherein the exit proxy metadata comprises at least one of: operating system configuration, battery level, network type, unique identifier (ID), internet protocol (IP) address, or geolocation.

13. The non-transitory computer-readable device of claim 8, wherein the WebSocket communication channel is persistent and allows bi-directional and full-duplex data exchange between an exit proxy and the proxy supernode.

14. The non-transitory computer-readable device of claim 13, wherein the WebSocket communication channel is kept alive using a series of ping-pong processes.

15. A system, comprising:
at least one processor; and
a memory storing instructions thereon that, when executed by the at least one processor, cause the at least one processor to perform operations comprising:
initiating a first network connection with a proxy supernode in a service provider infrastructure;
transmitting a request to upgrade the first network connection to support WebSocket communication channels to the proxy supernode;
receiving a Hypertext Transfer Protocol (HTTP) 101 switching protocol response code from the proxy supernode, wherein the HTTP 101 switching protocol response code establishes a WebSocket communication channel with the proxy supernode;
receiving a first WebSocket message from the proxy supernode, the first WebSocket message specifying (i) a uniform resource locator (URL) of a target server and (ii) a service or data requested by a client from the target server;
initiating a second network connection with the target server;
querying the target server for the service or data requested by the client;
in response to procuring the service or data requested by the client from the target server, formulating a second WebSocket message integrating the procured service or data; and
transmitting the second WebSocket message to the proxy supernode via the WebSocket communication channel.

16. The system of claim 15, wherein the operations further comprise receiving a third WebSocket message from the proxy supernode, the third WebSocket message specifying a service or data requested by a different client from a different target.

17. The system of claim 16, wherein the first, second, and third WebSocket messages are encoded using a MessagePack protocol.

18. The system of claim 16, wherein the first, second, and third WebSocket messages are transmitted to and from the proxy supernode via the WebSocket communication channel in an unsolicited manner without any restrictions or requirements.

19. The system of claim 15, wherein the operations further comprise transmitting exit proxy metadata to the proxy supernode, wherein the exit proxy metadata comprises at least one of: operating system configuration, battery level, network type, unique identifier (ID), internet protocol (IP) address, or geolocation.

20. The system of claim 15, wherein the WebSocket communication channel is persistent and allows bi-directional and full-duplex data exchange between an exit proxy and the proxy supernode.

\* \* \* \* \*